United States Patent [19]
Stripling et al.

[11] 3,752,998
[45] Aug. 14, 1973

[54] LINEAR SCANNING SEEKER WITH SINGLE AXIS ROTATION

[75] Inventors: William W. Stripling; Joe S. Hunter, both of Huntsville, Ala.

[73] Assignee: The United States of America as represented by the Secretary of the Army, Washington, D.C.

[22] Filed: Sept. 1, 1972

[21] Appl. No.: 285,791

[52] U.S. Cl............ 250/234, 250/203, 250/231 GY, 350/7, 356/248
[51] Int. Cl...... G01c 9/02, G01d 5/34, G02b 17/00
[58] Field of Search..................... 250/234, 231 GY, 250/203, 236; 356/248; 350/7

[56] References Cited
UNITED STATES PATENTS
3,653,737  4/1972  Stripling.................... 250/203 R X Primary Examiner—Archie R. Borchelt
Assistant Examiner—T. N. Grigsby
Attorney—Harry M. Saragovitz, Edward J. Kelly et al.

[57]  ABSTRACT

A linear scanning seeker with optical components mounted on a common rotational axis to facilitate field of view target area scanning without introducing unwanted precessional torques. The optical elements, with the exception of one prism, form an integral portion of a spinning gyroscopic mass. The seeker spin axis is defined by the gyroscopic mass spin axis. A parabolic primary mirror, which is cut into the face of the gyroscopic mass, and a slanted secondary mirror are positioned along the gyroscopic mass spin axis. A concave mirror and a prism are arranged to direct the incoming energy beam onto a detector in a direction orthogonal to the seeker spin axis. As the gyroscopic mass spins, energy beams from the seeker field of view are reflected off the primary, secondary, and concave mirrors. These energy beams are directed through the prism and scan the detector in a curved radial sweep pattern. The prism may be made to rotate in the same direction or in a direction opposite to the direction of spin of the gyroscopic mass. Rotating the prism in a direction opposite to the direction of the spinning gyroscopic mass increases the density of the curved radials. This same effect may be achieved by increasing the rotational speed of the gyroscopic spinning mass. In this invention, the gyroscopic mass and the prism are rotated about a common spin axis. This eliminates the necessity to counter rotate a mass to cancel the moment generated by the prism if it is not spun parallel to the seeker spin axis. A target is displayed on one of the beams when a target is present in the seeker field of view. Magnetic sensors react with magnets on the rotating gyroscopic mass and on the prism to indicate where a target is located in the seeker field of view when an image from the target is displayed on the detector.

6 Claims, 4 Drawing Figures

PATENTED AUG 14 1973 3,752,998

LINEAR SCANNING SEEKER WITH SINGLE AXIS ROTATION

BACKGROUND OF THE INVENTION

This invention is in the field of inertially stabilized target seekers. Such target seekers find use in homing guided missile systems. Homing guided missiles must be capable of receiving radiated energy from a target and have electronics for processing the target energy into output signals for torquing the seeker toward the target. A well known seeker, for example, is inertially stabilized by spinning the gimballed seeker reflector with the reflector being, in effect, a two-degree-of-freedom gyro. A problem with this well known concept lies in the inability to accurately locate returned target energy with respect to the total field of view. Prior to torquing the seeker toward the target, the seeker field of view should be scanned in some selected pattern by an energy detector for accurately establishing the location of the target. The present invention also overcomes known problem areas in other systems by mechanizing the gyroscopic mass and the prism to rotate about a common spin axis. This simplifies the design by eliminating the necessity to counter rotate a mass to cancel the moment generated by the prism. A similar device is disclosed in U.S. Pat. No. 3,653,737 entitled "Optical Scanning Seeker" by William W. Stripling et al, filed Aug. 24, 1970 and issued on Apr. 4, 1972.

SUMMARY OF THE INVENTION

The apparatus of the present invention is a linear scanning seeker with optical components mounted on a common rotational axis to facilitate field of view target area scanning without introducing unwanted processional torques. The field of view of the seeker is controlled by the self-stabilized gyroscopic mass that carries the optical elements therein. The seeker spin axis is defined by the gyroscopic mass spin axis. A parabolic primary mirror, which is cut into the face of the gyroscopic mass, and a slanted secondary mirror are positioned along the gyroscopic mass spin axis. A concave mirror and a prism are arranged to direct the incoming energy beam onto a detector in a direction orthogonal to the seeker spin axis. As the gyroscopic mass spins, energy beams from the seeker field of view are reflected off the primary, secondary, and concave reflectors. These energy beams are directed through the prism and scan the detector in a curved radial sweep pattern. The gyroscopic mass is driven by a motor and sweeps curved radial beams of the seeker field of view over the detector for indicating the position of a target with a high degree of accuracy. A target image will be displayed on one of the beams when a target is present in the seeker field of view. The prism may be mechanized to produce a three curved radial search pattern utilizing a single detector or three complete and three half sweeps utilizing two detectors. The second detector would be displayed radially 60° from the primary detector. The number of curved radials per revolution of the gyroscopic mass is governed by the number of faces on the prism. A target is displayed on one of the energy beams when a target is present in the seeker field of view. Magnetic position sensors react with magnets on the rotating gyroscopic mass and the prism to indicate the position of a target located in the seeker field of view when an image from the target is displayed on the detector.

DESCRIPTION OF THE PREFERRED EMBODIMENT

Figure 1:
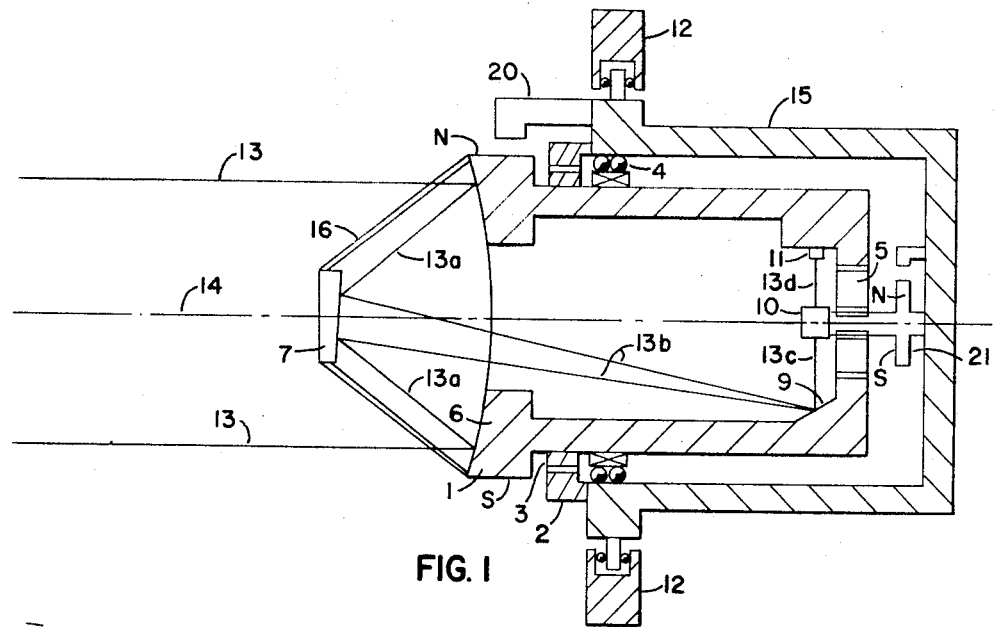
FIG. 1 is a schematic diagram of the linear scanning seeker.

Referring now to the drawings wherein like numerals represent like parts in all figures, there is disclosed a preferred embodiment of the invention in FIGS. 1, 2, 3, and 4. FIG. 1 discloses the linear scanning seeker mechanization. A spin stabilized gyroscopic mass 1 is driven by spin motor 2 having windings adjacent to and concentric with magnetic windings 3 on mass 1. Motor 2 is stationary on an inner gimbal 15 and imparts rotational motion to gyroscopic mass 1. Mass 1 is rotated on a train of bearings 4. Optical elements of the target seeker are carried by and rotate with mass 1, and include parabolic primary mirror 6 cut in face of mass 1, slanted secondary mirror 7 facing reflector 6, concave mirror 9, and detector 11. Detector 11 may be an infrared detector for detecting infrared energy reflected from a target. Alternately, detector 11 may either be a photocell for detecting light or a laser detector for detecting laser energy. With this arrangement of optical elements, energy beams 13 from the seeker field of view are passed over the detector in a curved radial pattern.

A feature of this invention is in the relative motion between the gyroscopic mass 1 and the prism 10 about the common axis 14. This mechanization eliminates the necessity to counter rotate a mass to cancel the moment generated by the prism. Prism 10 rotates relative to inner gimbal 15 through gear train 5 to permit variation of the relative motion between the gryoscopic mass 1 and the prism 10.

Parabolic primary mirror 6 gathers energy beams 13 from the seeker field of view and reflects these energy beams through a central opening to slanted secondary mirror 7 held on mass 1 by support 16. This support may be made of some material that allows the incoming energy beams to pass therethrough to mirror 6 yet provides sturdy support. Support 16 could be a temperature-stable solid optical glass or some transparent web material. Mirror 6 is, in effect, a two-degree-of-freedom gyro in which one degree of freedom is about a gimbal axis 12 (FIG. 1) and a second degree of freedom is about a second gimbal (not shown) that is orthogonal to gimbal axis 12. Gyroscopic mass 1 may then be precessed up, down, left, or right to align with a target. Beams 13 are reflected from parabolic primary mirror 6 to slanted secondary mirror 7. Beams 13b are then directed to concave mirror 9 and are reflected to prism 10. Beam 13c is transmitted through prism 10 where it is refracted and swept across detector 11.

Figure 2:
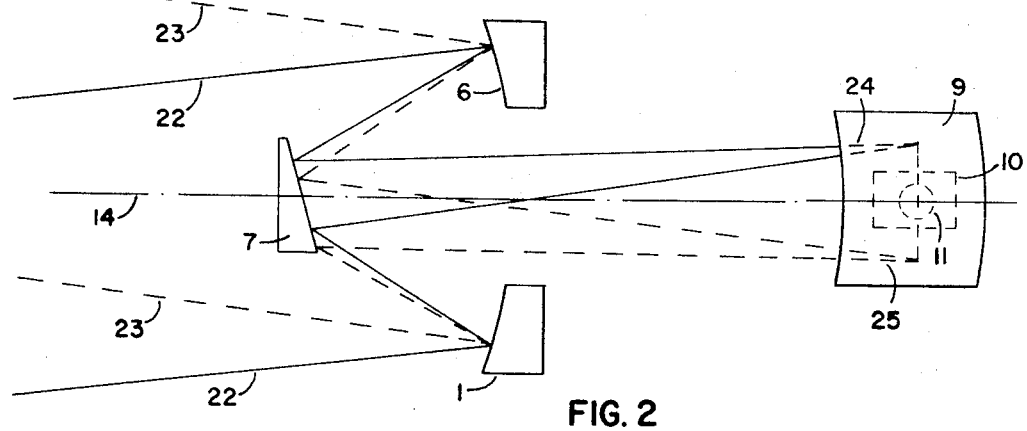
FIG. 2 is a schematic diagram of a portion of the linear scanning seeker rotated 90° about the seeker spin axis.

FIG. 2 is a schematic diagram of a portion of the linear scanning seeker rotated 90° about the seeker spin axis. This figure illustrates the method by which the concave mirror 9 sweeps multidirection energy beams over the detector. Target energy beams 22 come to focus 24 and target energy beams 23 come to focus 25 on concave mirror 9.

Figure 4:
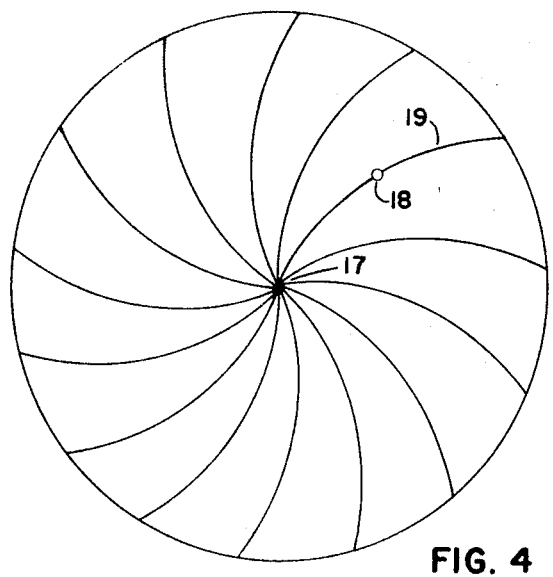
FIG. 4 shows the curved radial energy beams as they are swept over the detector.
Figure 3:
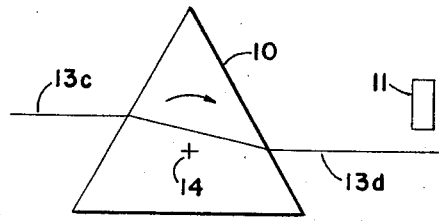
FIG. 3 illustrates the refraction of the laser energy beams as they are passed through the prism.

FIG. 3 illustrates the refraction of the beams 13c as they are passed through the prism 10. The beams are swept across detector 11 in curved radials, as shown in FIG. 4. Prism 10 bends the incoming energy beams over detector 11 one beam at a time for each flat surface of the prism which passes adjacent to the detector.

Referring to FIG. 4, each beam is bent a different amount from center 17 outward as gyroscopic mass 1 is rotated. Prism 10 is shown as an isosceles prism but may be a prism with more than three flat surfaces. Rotation of the isosceles prism 10 (while holding the gyroscopic mass fixed) through one-third of a revolution about seeker spin axis 14 will result in one straight radial sweep across the face of the detector. By rotating the gyroscopic mass through one-third of a revolution about the seeker spin axis 14, a sweep of one curved radial will be generated, i.e., curved radial beam 19 of FIG. 4. Three curved radials per incoming energy beam will be generated for each revolution of the gyroscopic mass 1. If a target is in the field of view when radial beam 19 is swept across the detector, a target image, represented by numeral 18, will be transmitted through the optical elements to detector 11. An electrical output signal is generated from detector 11 and is applied to an electronic signal processor (not shown) when a target image is present on one of the radial beams. The position of the target in the seeker field of view is uniquely determined by the position sensors 8 and 20. The position sensors may be the magnetic type. If position sensor 20 is the magnetic type, a magnet on the gyroscopic mass 1 reacts with windings on sensor 20. Position sensor 20 is stationary with respect to the rotating magnet from which the sensor reacts. Sensor 20 is stationary on gimbal ring 15. The output of position sensor 20 is a continuous sinusoidal signal that is derived from a magnet on gyroscopic mass 1. The magnet is shown in FIG. 1 with N and S poles 180° degrees apart. Position sensor 8 operates in conjunction with the magnetic disc 21 in a similar fashion to determine prism position. Resolution of this continuous sinusoidal signal may be had by feeding the signal to an analog-to-digital converter (not shown). A converted signal at the output of the analog-to-digital converter is fed to the signal processor for correlation with the target image output from detector 11 to accurately determine the location of the target in the seeker field of view. The 360 electrical degrees of one complete cycle of the sinusoidal signal corresponds with the 360° around the seeker field of view. The magnitude and polarity of the sinusoidal signal from sensors 20 and 8 at the instant a target image is displayed on detector 11 indicate the position that the target is located in degrees around the seeker field of view from some imaginary reference line and the distance outward from the spin axis of the seeker. By using an isosceles prism, the 360 electrical degrees of one complete cycle of this sinusoidal signal is related with three sweeps of the curved radial beams. Position sensors 20 and 8, therefore, provide a continuous signal to the signal processor for indicating the position of the target in the seeker field of view when a target image is displayed on detector 11. The output of sensor 20 may also furnish an input to a speed control circuit (not shown) for controlling the rotational speed of the gyroscopic mass 1.

The sweep direction of the beams across detector 11 may be from center 17 outward, or from the outermost part toward center 17, depending on the synchronization of the signal processor connected with rotating gyroscopic mass 1 and detector 11 (FIG. 4). The signal processor may be set to start the sweep pattern, for example, when the sinusoidal output from position sensor 20 reaches its maximum positive value. The target image 18 is then uniquely determined to be a certain distance from center 17 and a certain angle around the seeker field of view from some established reference line. The seeker may then be torqued in the proper direction to align the target along the center line of the seeker spin axis.

In summary, the apparatus of this invention is a novel linear scanning seeker mechanized with optical components mounted on a common rotational axis to facilitate field of view target area scanning without introducing unwanted precessional torques. The field of view of the seeker is controlled by the self-stabilized gyroscopic mass that carries the optical elements. Energy beams are directed through the optical elements and scan the detector in a curved radial sweep pattern. The gyroscopic mass is driven by a motor and sweeps curved radial beams of the seeker field of view over the detector for indicating the position of a target with a high degree of accuracy. A single detector can be used to display a target image on one of the beams when a target is present in the seeker field of view.

We claim:

1. An optical scanning target seeker for use in a target pursuit vehicle comprising:
    a. a gyroscopic mass having its spin axis defining the spin axis of said target seeker;
    b. means for spinning said gryoscopic mass;
    c. optical elements carried by said gyroscopic mass and forming an integral portion of said gyroscopic mass for transmitting a target image into said gyroscopic mass;
    e. detector means for detecting said transmitted signal;
    f. prism means mounted on a prism spin axis common to said seeker spin axis; and,
    g. means for rotating said prism wherein said gyroscopic mass and prism rotate with respect to each other to sweep linear curved radial beams of the seeker field of view over said detector for locating the position of a target image on said detector in relation to the center of said detector.

2. An optical scanning target seeker as set forth in claim 1 wherein said means for rotating said prism includes gear train means carried by said gyroscopic mass for rotational support of said prism.

3. An optical scanning target seeker as set forth in claim 2 including position sensing means for generating signals indicative of target position in the seeker field of view when a target image is displayed on said detector.

4. An optical scanning target seeker as set forth in claim 3 wherein said position sensing means includes a first magnetic pick-off for determining prism position; and, a second magnetic pick-off for determining gyroscopic mass position.

5. An optical scanning target seeker as set forth in claim 4 wherein said optical elements includes a parabolic mirror; a slanted mirror positioned facing the reflective surface of said parabolic mirror, said parabolic mirror and said slanted mirror being positioned along said seeker spin axis, a focusing lens and a detector, said focusing lens being positioned within said gyroscopic mass for focusing images reflected from said slanted mirror onto said rotating prism, whereby when energy beams from a target in the seeker field of view is reflected on said detector to display a target image on said detector for determining the position of said target in the field of view of said seeker.

6. An optic scanning target seeker as set forth in claim 5 wherein said parabolic mirror is cut into said gyroscopic mass.

* * * * *